United States Patent [19]

Herbort et al.

[11] 4,405,565

[45] Sep. 20, 1983

[54] TUBULAR REACTION FURNACE FOR INDIRECT HEATING OF CRACKABLE FLUIDS

[75] Inventors: Hans-Joachim Herbort; Heinz G. Schuster, both of Dortmund, Fed. Rep. of Germany

[73] Assignee: UHDE GmbH, Dortmund, Fed. Rep. of Germany

[21] Appl. No.: 439,319

[22] Filed: Nov. 4, 1982

[30] Foreign Application Priority Data

Nov. 14, 1981 [DE] Fed. Rep. of Germany ....... 3145292

[51] Int. Cl.³ ................................................ B01J 8/06
[52] U.S. Cl. ..................................... 422/197; 52/167; 203/DIG. 24; 208/78; 248/72; 422/312
[58] Field of Search ............... 422/196, 197, 167, 200, 422/202, 312; 196/107; 203/DIG. 24; 208/78, 125, 129; 248/49, 56, 72; 52/167, 219, 220; 55/267; 261/DIG. 11

[56] References Cited

U.S. PATENT DOCUMENTS

| | | |
|---|---|---|
| 3,257,172 | 6/1966 | Kao et al. ............................ 422/197 |
| 3,607,130 | 9/1971 | Worley et al. ...................... 422/197 |
| 3,870,476 | 3/1975 | Marsch ............................ 422/312 X |
| 4,181,693 | 1/1980 | Swindt ......................... 261/DIG. 11 |
| 4,183,897 | 1/1980 | Lanteri ................................ 422/197 |
| 4,308,913 | 1/1982 | Heeren et al. .............. 261/DIG. 11 |
| 4,325,916 | 4/1982 | Worley ................................ 422/197 |
| 4,330,491 | 5/1982 | Doshi et al. ................ 261/DIG. 11 |

FOREIGN PATENT DOCUMENTS 1197202 7/1970 United Kingdom ................ 422/197

Primary Examiner—Richard L. Chiesa
Attorney, Agent, or Firm—Wilson, Fraser, Barker & Clemens

[57] ABSTRACT

The invention relates to a tubular reaction furnace for the indirect heating of crackable fluids, particularly for cracking hydrocarbons used for the extraction of gases rich in CO and $H_2$, said furnace consisting of a plurality of vertical reaction tubes arranged in a firing chamber with internal fuel-gas burners. The invention primarily relates to furnaces in which cracking takes place at high pressures and temperatures and which are installed on floating carriers such as ships.

5 Claims, 4 Drawing Figures

TUBULAR REACTION FURNACE FOR INDIRECT HEATING OF CRACKABLE FLUIDS

BACKGROUND OF THE INVENTION

Tubular reaction furnaces are known in which the reaction tubes arranged in the firing chamber form registers or bundles. The tubes can be filled with a catalyst or packing to control the chemical reaction. Normally, the tubes are arranged vertically in the firing chamber such that they can be filled with a catalyst in a proper and uniform manner. In this configuration, upper and lower ends of the tubes can be supported. According to other designs, the upper end is suspended or the lower end is supported while the free ends of the tubes penetrate the firing chamber. Both designs prevent, for instance, thermal stress. The reaction fluid is piped to the reaction tubes via a header system and withdrawn from the tube ends via a product gas header.

According to the traditional design, the reaction tubes are fixed at one end to compensate for tube elongation caused by thermal expansion. In order to fix the position of the reaction tubes in the furnace, the upper and lower ends are arranged such that the tubes cannot move horizontally.

Tubular reaction furnaces have, so far, only been installed ashore. In this case, horizontal dynamic forces do not act on the tube registers during furnace operation. When such reaction furnaces are installed on floating carriers such as floating plant platforms, the structure must withstand static as well as horizontal dynamic loads caused by the sea or storms. The tube length of 10 to 14 m and the additional weight of the catalyst cause bending stresses which act on the reaction tubes during furnace operation. It is therefore necessary to design the tubes for such loads, but the wall thickness involved in conjunction with the required tube length will result in on-stream times that are insufficiently long.

SUMMARY OF THE INVENTION

The aim of the invention is to design an adequate intermediate support for the reaction tubes of furnaces used in floating plants, whereby the free end of the active tube is supported such that additional dynamic loads caused by the floating platform movements are reduced to an acceptable minimum.

It was found that the aim of the invention can be achieved by arranging a plurality of parallel horizontal duct-type beams in the firing chamber center. The beams must have external insulation and wall-to-wall length. The rows of vertical reaction tubes penetrate the gastight beams and are fixed horizontally therein. The space between the beams is sufficient to ensure passage of the fuel gas.

A further embodiment of the invention provides for a firing chamber with a plurality of parallel horizontal duct-type beams which are arranged on the vertical axis of the firing chamber center and have at least wall-to-wall length. The horizontal duct-type beams are attached to the external side of the vertical tube rows and arranged such that the passage of the fuel gas is ensured.

If the duct-type beams are of the lattice type, they must be equipped with a gastight sheet steel lining. According to a further embodiment, the duct-type beams are designed such that they penetrate the front and rear walls and can be cooled by air. In order to protect the duct-type beams against heat, it is recommended to insulate each reaction tube section penetrating the beams, using insulation packages and elements.

The intermediate tube supports which reduce the length of the free tube ends in the firing chamber improve the service life of reaction tubes such as are used in furnaces installed ashore. The duct-type beams are designed such that they have to resist a minimum load and are fully protected against the hot gas in the firing chamber. Moreover, it is possible to walk on the structure when the furnace has not completely cooled down.

BRIEF DESCRIPTION OF THE DRAWINGS

The above and other objects of the invention will become apparent to one skilled in the art from reading the following detailed description of the invention when considered in the light of the accompanying drawings, in which.

DETAILED DESCRIPTION OF THE PREFERRED EMBODIMENT OF THE INVENTION

Figure 1:
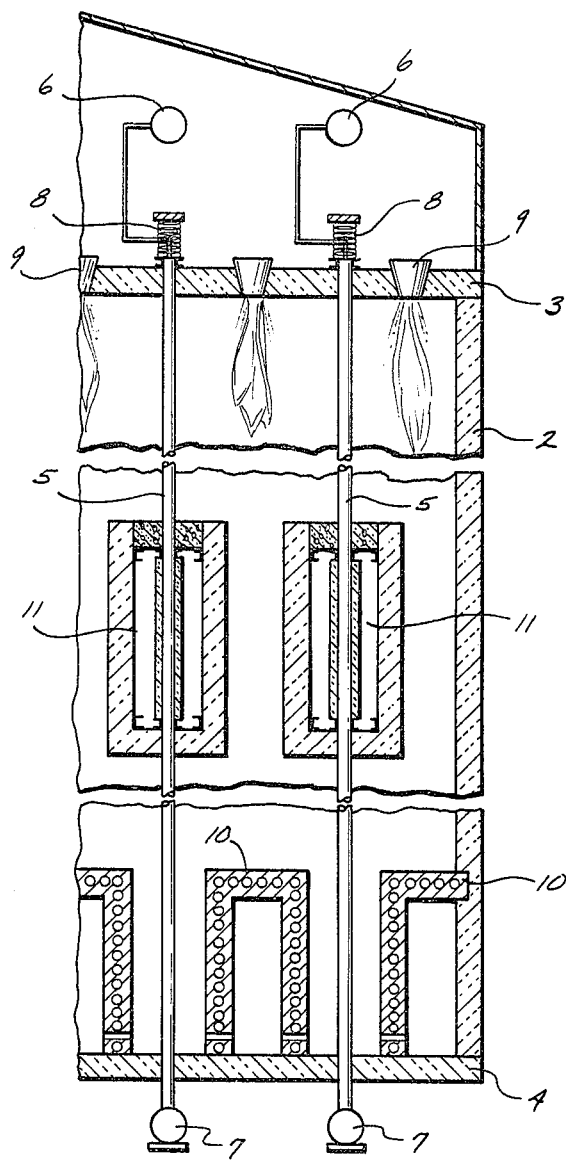
FIG. 1 is a longitudinal sectional view of the tubular reaction furnace embodying features of the invention.

The tubular reaction furnace is a steel structure consisting of heat-insulated walls 2, ceiling 3, and furnace floor 4. The reaction tubes 5 are filled with a catalyst and arranged in vertical rows. The upper end of each row penetrates the ceiling and is connected to inlet header 6, while the lower end penetrates the furnace floor and is connected to the product gas header 7. The tubes are fixed in a straight vertical position by means of spring assemblies 8 to compensate for thermal expansion. The tube rows are heated by means of burners 9 arranged in the furnace ceiling. The flue gas ducts 10 are arranged in parallel on the floor in order to ensure a uniform passage of the fuel gas and a uniform withdrawal of the flue gas.

According to the invention, the reaction tubes are fixed in the furnace by means of horizontal duct-type beams 11 with external insulation in order to reduce the free-end length of the reaction tubes which are 10 to 14 m. The beams 11 are arranged parallel to the rows of tubes 5 and extend from the front to the rear wall. The space between the beams 11 is sufficient to ensure passage of the fuel gas.

Figure 2:
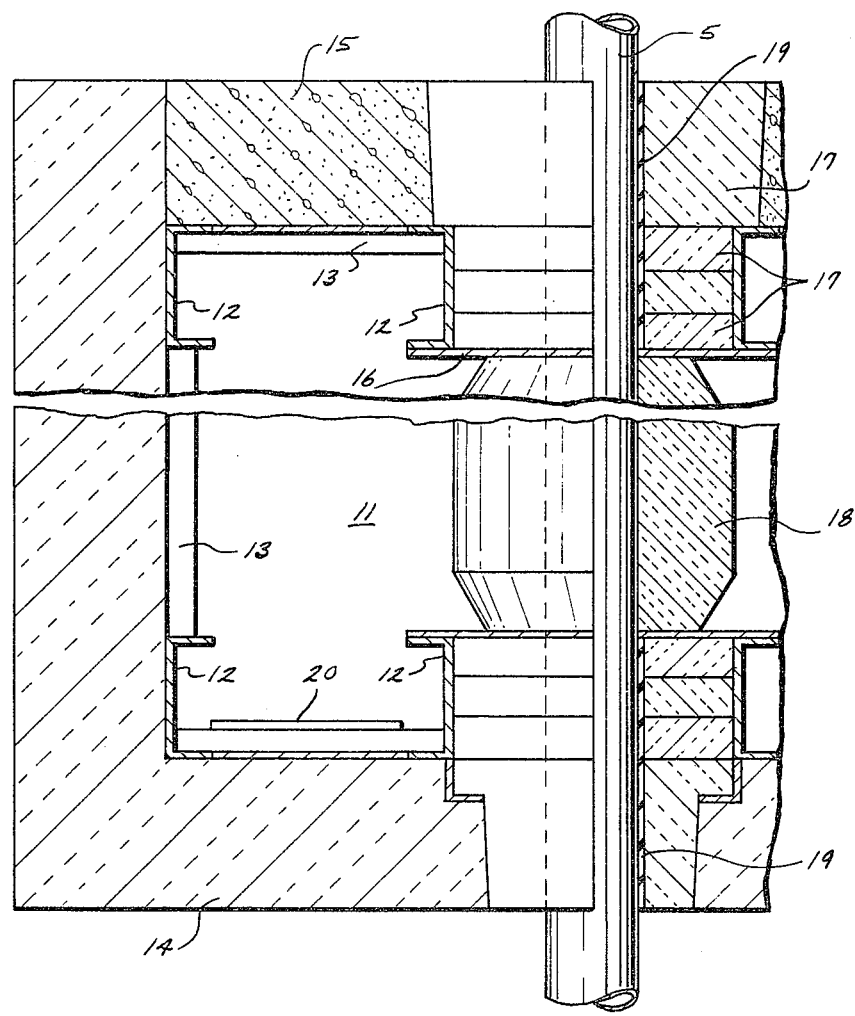
FIG. 2 is an enlarged fragmentary sectional view of a duct-type beam similar to that illustrated in FIG. 1 with the reaction tube penetrating the beam center.

According to FIG. 2, the duct-type beam 11 consists of many sectional beams 12 and is reinforced by a gastight sheet lining 13. The external insulation 14 protects the supporting members of the duct-type beam 11 against heat. The upper surface of beam 11 has a layer of refractory concrete 15 suitable for foot traffic.

The undivided reaction tube is fixed horizontally in the beam by means of two support plates 16 which also interconnect the two parts of the duct-type beam. The insulation package 17 and insulation elements 18 protect the duct-type beam 11 against the reaction tube heat. The seals 19 are placed between reaction tube 5 and insulation packages 17 and prevent the penetration of heating gas from the firing chamber into the beam. It is possible to dimension the beams such that they can be equipped with grids suitable for foot traffic.

Figure 3:
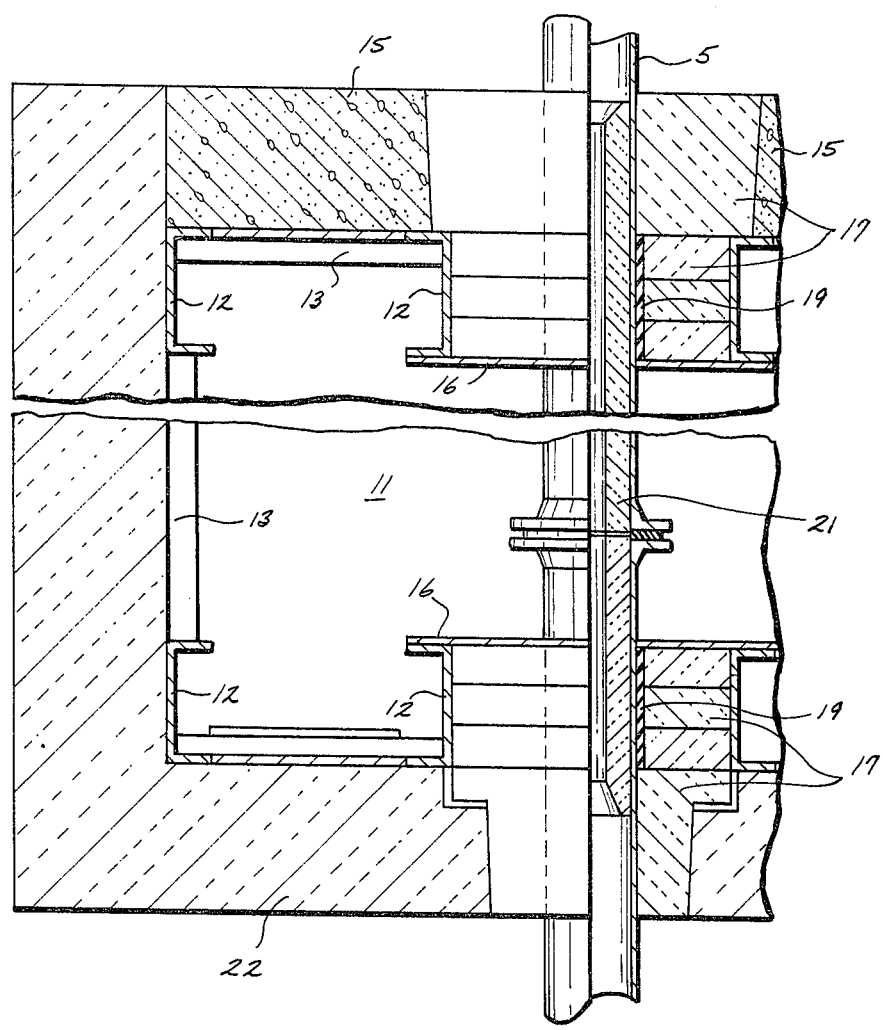
FIG. 3 is an enlarged fragmentary sectional view similar to FIG. 2 illustrating a duct-type beam with dividend reaction tube in the center and heat insulation.

According to FIG. 3, the external insulation elements 18 of the embodiment illustrated in FIG. 2 are not required if the reaction tube 5 consists of two parts connected by a flange in the duct-type beam 11. In this configuration, the reaction tube section penetrating the beam 11 can be heat-insulated by means of the liner 21 such that both tube parts can be filled with a catalyst and that the product gas in the tubes does not heat the other tubes in the beam to an inadmissible degree.

Figure 4:
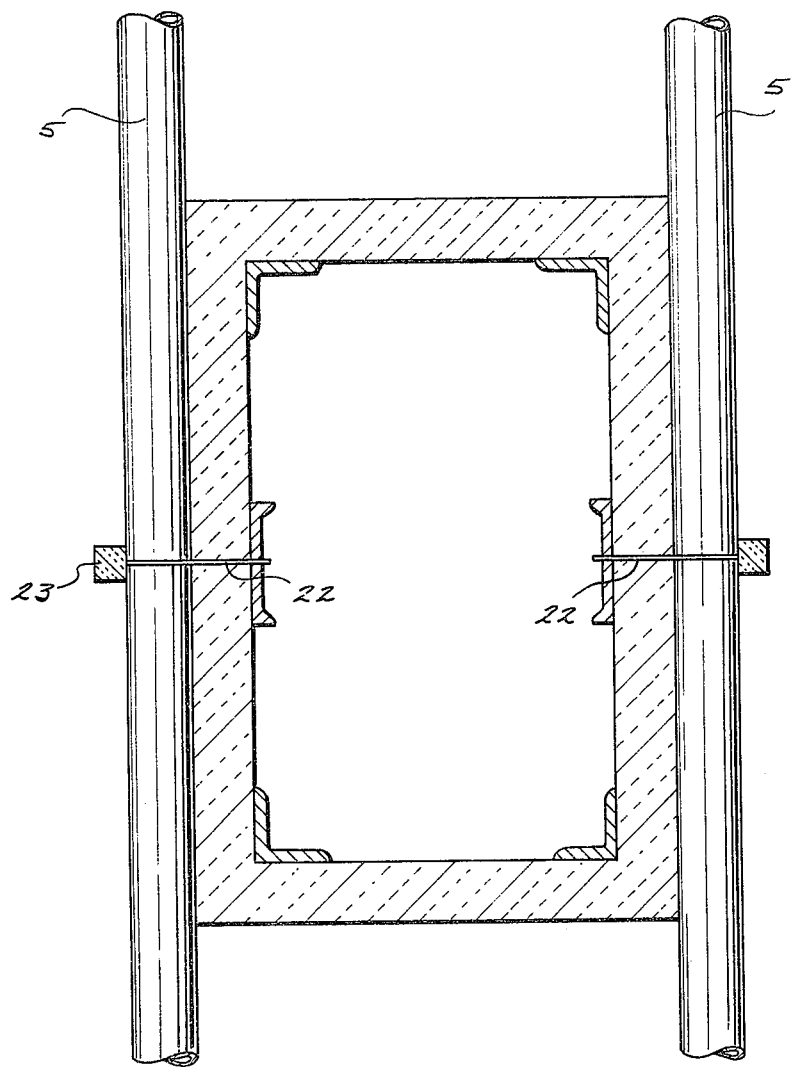
FIG. 4 is an enlarged sectional view of an embodiment of a duct-type beam with two external reaction tubes.

According to FIG. 4, the reaction tubes 5 can also be attached to the external side of horizontal duct-type beams, i.e., one row or two rows to one beam. The tube support plates 22 penetrate only a minimum section of the external insulation in order to reduce the heat transfer to a minimum. The support plates 22 are insulated by means of prefabricated insulation rings 23 protecting the plates 22 against the hot fuel gas.

It is recommended that the box-type beams protrude from the front and rear walls and be connected to the duct for withdrawing the combustion air from the tubular reaction furnace. Thus, the beams have an efficient internal cooling.

What we claim is:

1. In a tubular reaction furnace of the type having a firing chamber defined by opposed walls and provided with internal fuel-gas burners and a plurality of vertically oriented reaction tubes arranged in rows in the firing chamber for the indirect heating of crackable fluids, particularly for cracking hydrocarbons used for the extraction of gases rich in CO and $H_2$, the improvement comprising:
    a plurality of spaced, parallel duct-type beams extending horizontally across the center region and between opposed walls of the firing chamber with the spaces therebetween insuring passage of the fuel gas;
    each beam supporting a row of the vertically oriented reaction tubes wherein the reaction tubes penetrate said duct-type beams; and
    means for insulating the external surfaces of said duct-type beams and means for affixing the reaction tubes to said duct-type beams.

2. In a tubular reaction furnace of the type having a firing chamber defined by opposed walls and provided with internal fuel-gas burners and a plurality of vertically oriented reaction tubes arranged in rows in the firing chamber for the indirect heating of crackable fluids, particularly for cracking hydrocarbons used for the extraction of gases rich in CO and $H_2$, the improvement comprising:
    a plurality of spaced, parallel duct-type beams extending horizontally across the center region and between opposed walls of the firing chamber with the spaced between said duct-type beams insuring passage of the fuel gas;
    each beam supporting at least one row of the vertically oriented reaction tubes wherein the row of reaction tubes is attached to the external side of said duct-type beam; and
    means for insulating the external surfaces of said duct-type beams and means for affixing the reaction tubes to said duct-type beams.

3. A tubular reaction furnace according to claims 1 or 2, wherein said duct-type beams are lattice beams reinforced by a gas tight internal sheet lining.

4. A tubular reaction furnace according to claims 1 or 2, wherein said duct-type beams protrude from the opposed walls and are designed for internal air cooling.

5. A tubular reaction furnace according to claims 1 or 2, each of said reaction tubes affixed to said duct-type beam is insulated by means of insulation packages and insulation elements.

* * * * *